INVENTOR.
DONALD A. KING

May 5, 1964 D. A. KING 3,131,680
TWO-STROKE INTERNAL COMBUSTION ENGINE
Filed July 18, 1961 4 Sheets-Sheet 2

INVENTOR.
DONALD A. KING
BY Hazard & Miller
ATTORNEYS

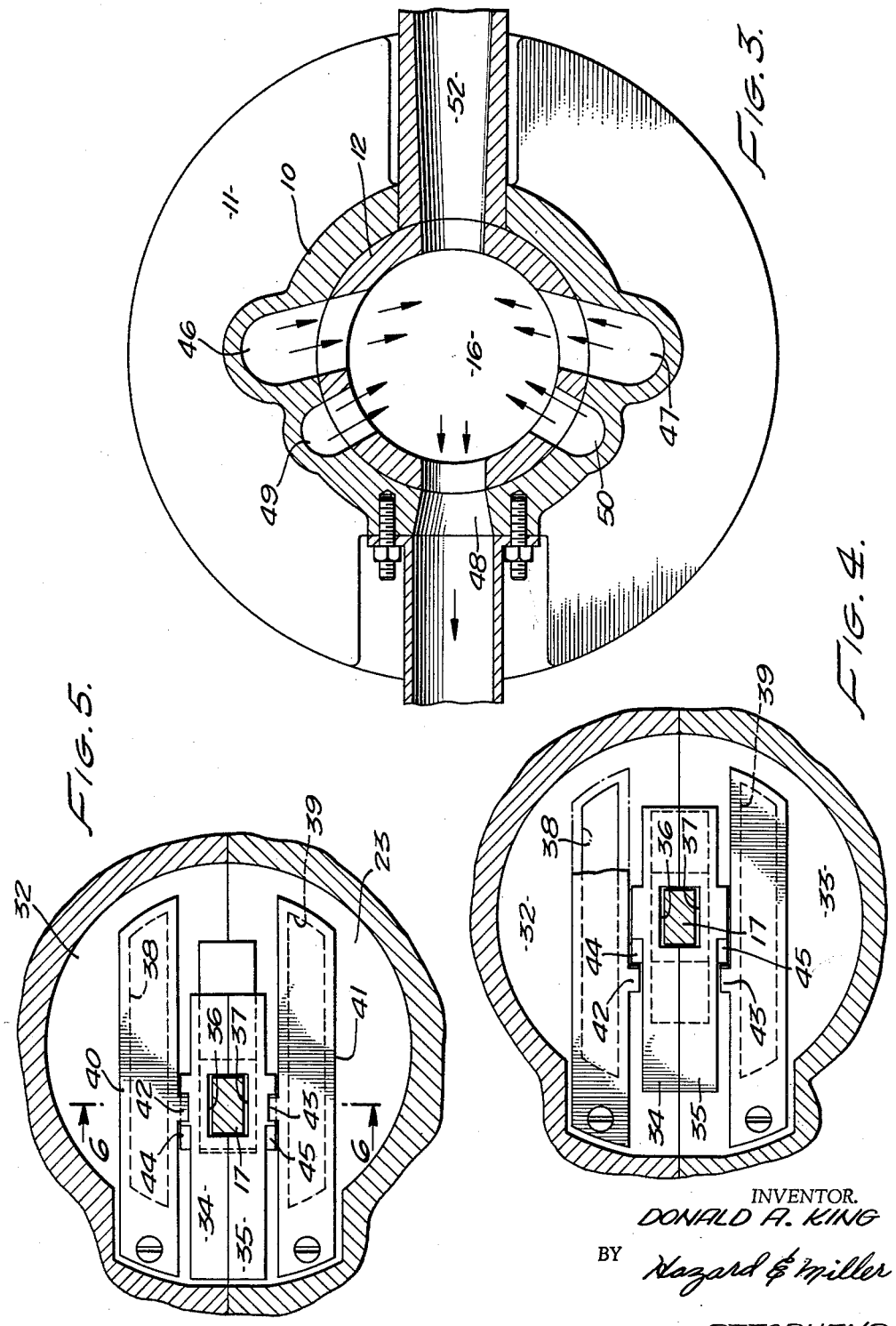

May 5, 1964    D. A. KING    3,131,680
TWO-STROKE INTERNAL COMBUSTION ENGINE
Filed July 18, 1961    4 Sheets-Sheet 4
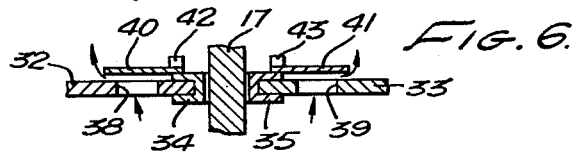
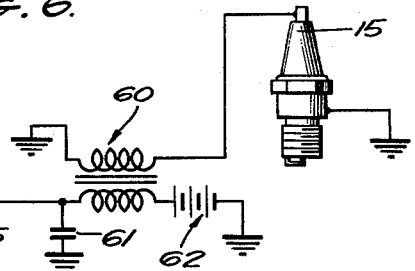
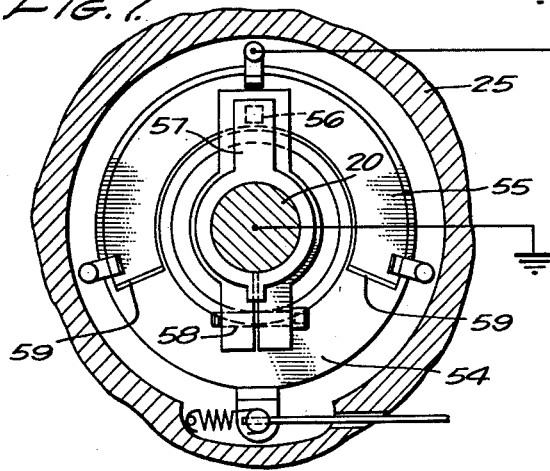
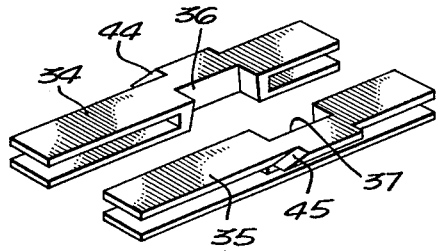
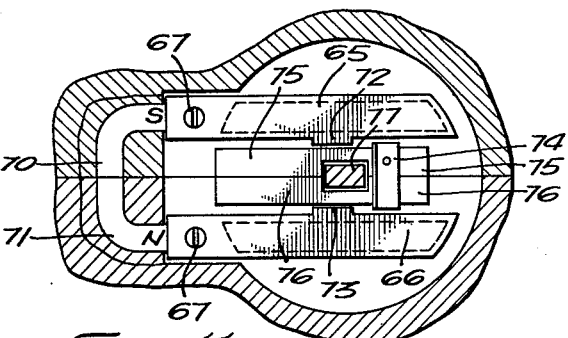
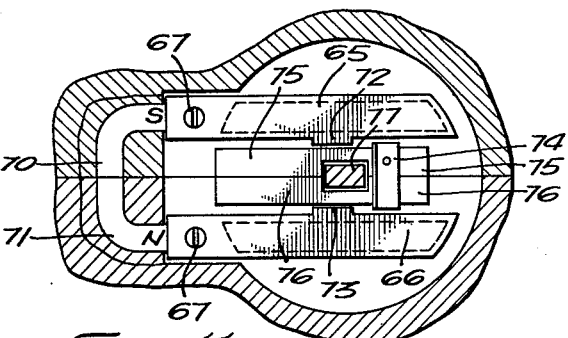
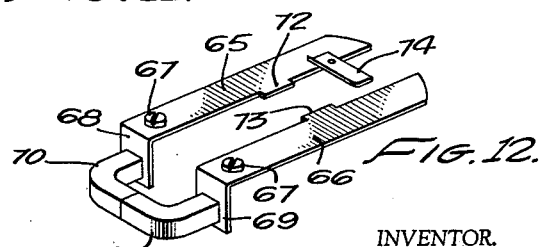
INVENTOR.
DONALD A. KING
BY Hazard & Miller
ATTORNEYS

United States Patent Office 3,131,680
Patented May 5, 1964

3,131,680
TWO-STROKE INTERNAL COMBUSTION ENGINE
Donald A. King, Costa Mesa, Calif., assignor, by mesne assignments, of one-half to Straza Industries, Inc., El Cajon, Calif., a corporation of California
Filed July 18, 1961, Ser. No. 126,839
2 Claims. (Cl. 123—74)

This invention relates to improvements in internal combustion engines, and particularly to that type of internal combustion engine that is commonly referred to as a two-stroke engine.

Explanatory of the present invention, in the usual or conventional two-stroke engine the fuel mixture to which lubricant is usually added is admitted to the crankcase of the engine and is transmitted therefrom through ports or passages to the top of the cylinder above the piston during downstrokes of the piston. In the usual design, the volume in the crankcase, together with the volume in the cylinder below the piston when the piston is at the top of its stroke is such that only a low compression can be developed in the incoming fuel prior to its transmission to the top of the cylinder. It is, of course, desirable to have the incoming fuel compressed by the descending piston to a relatively high degree to insure that the maximum possible charge enters the cylinder.

The ports or passages which conduct the fuel mixture from the crankcase are usually of full size and the periods of time during which they are opened by the piston are brief. Consequently, if the fuel mixture can be compressed to a higher degree prior to transmission through the ports or passages to the top of the cylinder, a greater charge will be taken into the cylinder.

A primary object of the present invention is to provide an improved internal combustion engine of the two-stroke type wherein provision is made for isolating the bottom of the cylinder from the crankcase during decending strokes of the piston. In this manner, if a fuel mixture together with lubricant is admitted to the crankcase and then conducted to the bottom of the cylinder and kept isolated from the crankcase during descending strokes of the piston, the fuel mixture can be confined in a relatively small space. Consequently, during descending strokes of the piston the fuel mixture will be compressed to a much higher degree by the descending piston before it is transmitted to and admitted to the top of the cylinder. The higher crankcase pressure enables more fuel to be delivered to the combustion chamber in the brief interval available for this part of the cycle.

Another object of the invention is to provide an internal combustion engine having the above-mentioned characteristics wherein an additional fuel inlet may be employed to admit fuel to the cylinder below the piston when the piston is near the top of its stroke so as to be compressed by the piston against the isolating means which isolates the cylinder from the crankcase during downstrokes of the piston.

The fuel admitted through the second fuel inlet may but need not carry a lubricant. Furthermore it may, but need not be of the same type of fuel that is admitted to the crankcase. Consequently, fuels possessing additional or desirable characteristics but which are nevertheless compatible with fuels admitted to the crankcase may be used to obtain desirable engine performance.

Still another object of the invention is to provide an engine having the above-mentioned characteristics wherein ports or passages are opened in proper sequence or timing to discharge some incoming fuel at high pressure adjacent the exhaust port from the cylinder so as to retard flow through the exhaust port when the burnt gases have been practically exhausted from the cylinder. In this manner a waste of fuel and loss of power occasioned by incoming gases following the exhaust gases through the exhaust port at high engine speeds is minimized.

A further object of the invention is to provide an engine which is quite versatile in meeting various engine requirements. By using the same basic engine parts, and by the application or removal of a small number of additional parts the basically same engine can be modified readily and caused to have different characteristics to meet various engine requirements.

With the foregoing and other objects in view, which will be made manifest in the following detailed description and specifically pointed out in the appended claims, reference is had to the accompanying drawings for an illustrative embodiment of the invention, wherein:

FIG. 3 is a horizontal section taken substantially upon the line 3—3 upon FIG. 1 in the direction indicated;

FIG. 4 is a partial view in horizontal section taken substantially upon the line 4—4 upon FIG. 1, and illustrating the position assumed by parts when the connecting rod is in a vertical position;

FIG. 5 is a view similar to FIG. 4, but illustrating the connecting rod as having been displaced from its vertical position shown in FIG. 1;

FIG. 6 is a partial view in vertical section taken substantially upon the line 6—6 upon FIG. 5;

FIG. 7 is a vertical section taken substantially upon the line 7—7 upon FIG. 2 in the direction indicated;

FIG. 8 is an exploded view in perspective of the elements employed to assist in isolating the bottom of the cylinder from the crankcase during downward strokes of the piston;

FIG. 9 is a schematic view illustrating the operation of the engine during upward strokes of the piston;

FIG. 10 is a similar view to FIG. 9, but illustrating the piston at the bottom of its downward stroke;

FIG. 11 is a partial view similar to FIG. 5, but illustrating an alternative form of construction; and FIG. 12 is a perspective view of parts employed in the construction shown in FIG. 11.

Figure 1:
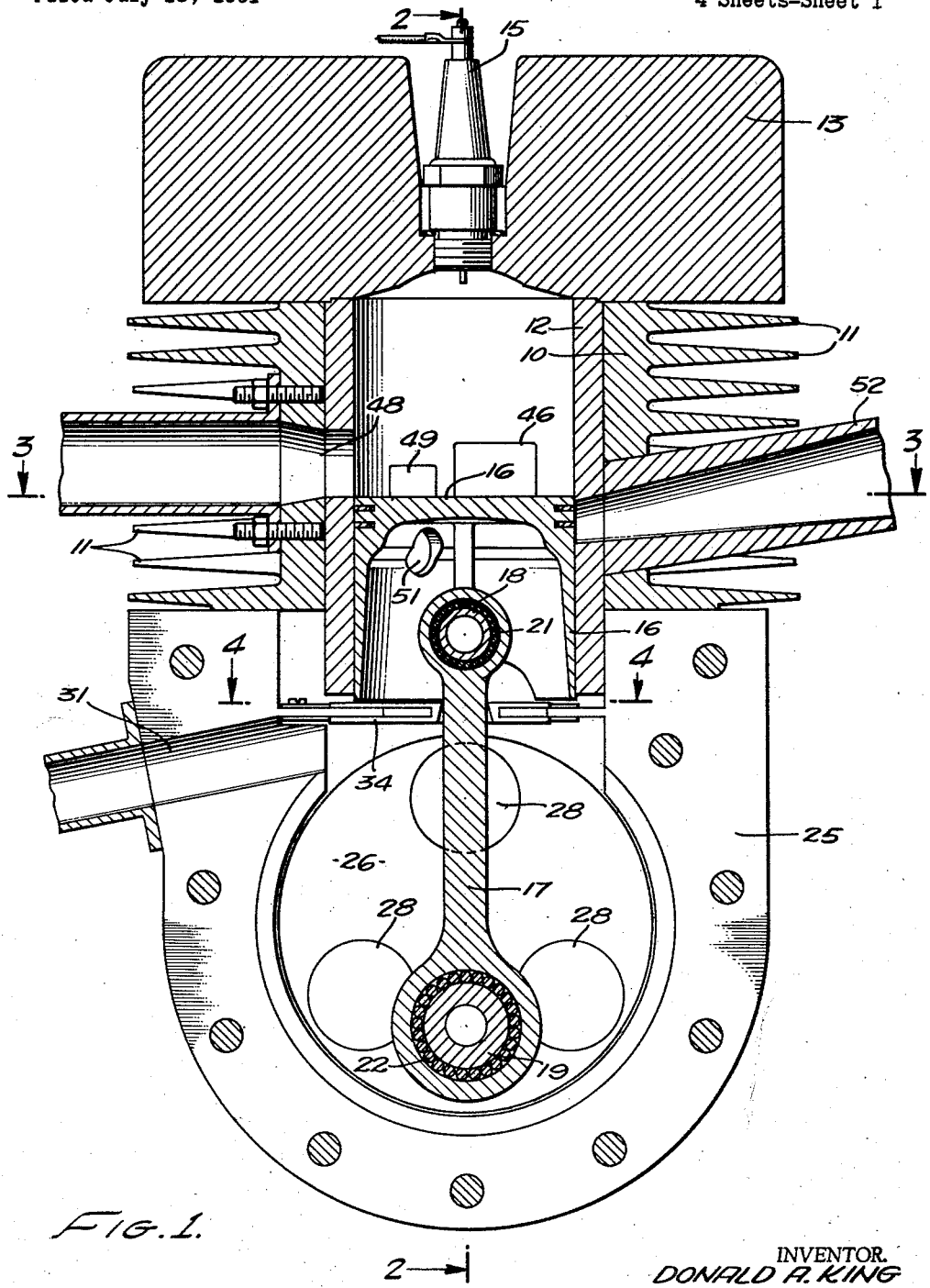
FIGURE 1 is a vertical section transverse to the crankshaft of an internal combustion engine embodying the present invention.
Figure 2:
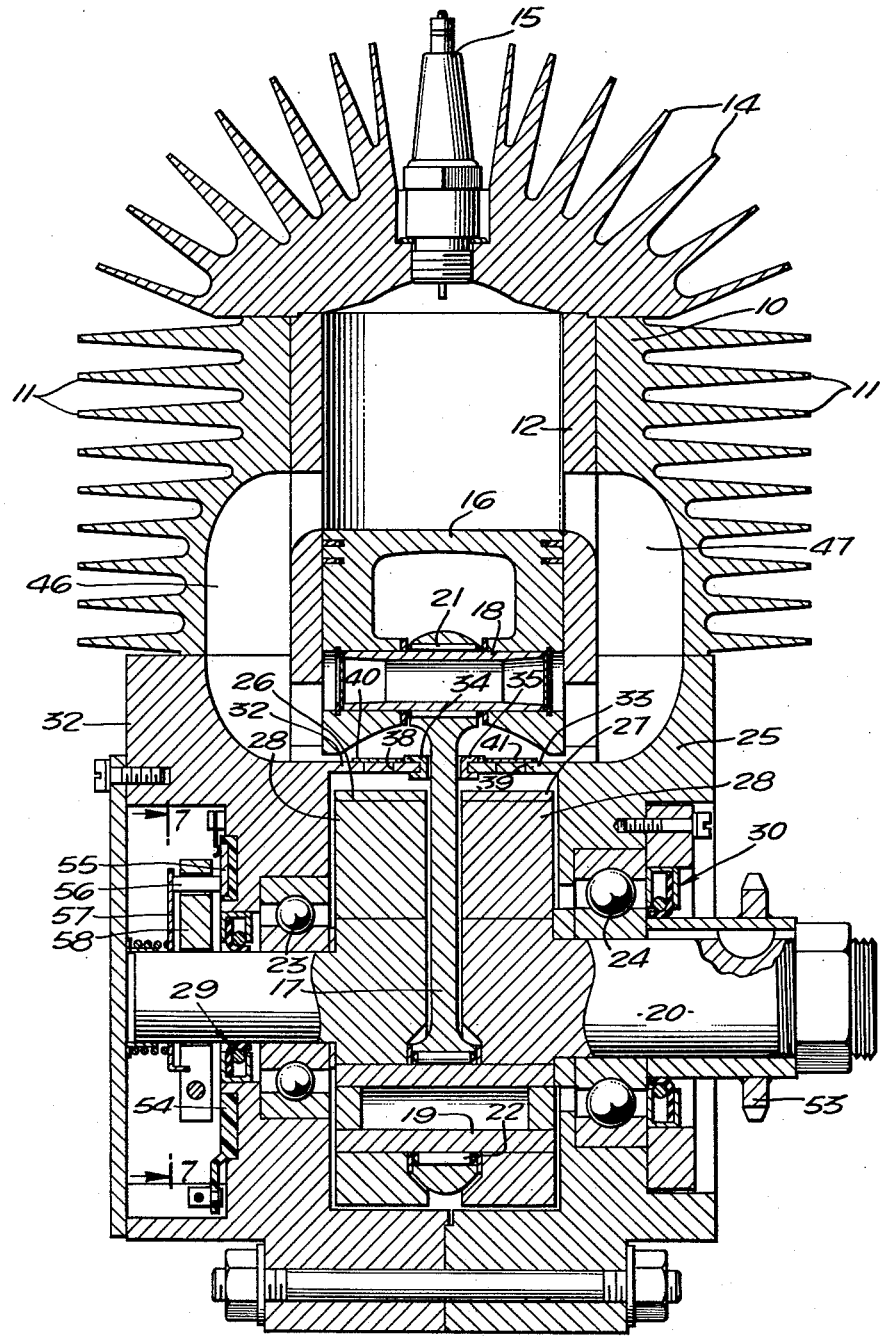
FIG. 2 is a vertical section taken at right angles to FIG. 1 and substantially on the line 2—2 on FIG. 1 in the direction indicated.

Referring to the accompanying drawings wherein similar reference characters designate similar parts throughout, the improved engine consists of a cylinder body 10 suitably equipped with heat-radiating fins 11 and within which there is a cylinder liner 12. The cylinder head indicated at 13 is also equipped with heat-radiating fins 14 and with a conventional sparkplug 15.

Within the cylinder there is reciprocable a piston 16 having a connecting rod 17 which connects the wristpin 18 of the piston with the crankpin 19 of the crankshaft 20. Suitable anti-friction bearings 21 and 22 may be disposed between the connecting rod 17 and the wristpin 18 and crankpin 19, respectively. Anti-friction bearings 23 and 24 rotatably mount the crankshaft 20 in the crankcase generally indicated at 25. The interior of the crankcise is largely occupied by flywheels 26 and 27 arranged on opposite sides of the connecting rod 17 and these flywheels may be balanced such as by weights 28 inserted therein. 29 and 30 indicate seals arranged outwardly of the bearings 23 and 24 to confine lubricant at the bearings and to prevent escape of fuel admitted to the crankcase.

31 indicates an inlet port which supplies vaporized or gaseous fuel and lubricant to the interior of the crankcase. This fuel may be vaporized by any preferred form of carburetor, not shown.

One feature of the improved engine resides in the provision of a oneway type of valve between the crankcase and the bottom of the cylinder. To this end it will be observed that the major portion of the length of the connecting rod 17 is of uniform cross-section and the top of the crankcase is formed with inwardly extending flanges or partial partitions 32 and 33. These flanges or partial partitions serve as rails for a slide made up of two opposed parts 34 and 35, see FIG. 8, which have opposed recesses 36 and 37, respectively, that fit about the connecting rod 17. These recesses have their end walls sloping outwardly and downwardly as clearly shown in FIG. 1 so as to accommodate the angular movements of the connecting rod 17.

At the sides of the opposed slide members 34 and 35 the flanges or partial partitions 32 and 33 are provided with ports therethrough indicated at 38 and 39, that are normally closed by reeds 40 and 41, respectively. These reeds in effect form oneway valves between the crankcase and the bottom of the cylinder permitting the flow of gaseous fuel from the crankcase to the bottom of the cylinder when the piston 16 is on its upward stroke. They prevent flow in the reverse direction, that is from the cylinder toward the crankcase when the piston 16 is on its downward stroke. Each of the reeds 40 and 41 may have an inwardly extending lug 42 and 43 and these lugs function as cam followers interposed in the paths of inclined cams 44 and 45 that are formed on the parts 34 and 35 of the slide.

When the engine is operating the parts 34 and 35 of the slide which embraces the connecting rod 17 reciprocate back and forth on the flanges or partial partitions 32 and 33 and during such reciprocation the cams 44 and 45 will cam the reeds 40 and 41, respectively, into open positions during upward strokes of the piston 16, thus opening the ports 38 and 39 for flow from the crankcase to the bottom of the cylinder. During downward strokes the cams 44 and 45 will have receded from their respective lugs 42 and 43 and will allow the reeds 40 and 41 to close their respective ports, thus isolating the bottom of the cylinder from the crankcase.

In the body 10 of the cylinder there are opposed inlet passages 46 and 47 the lower ends of which are normally open to the bottom of the cylinder and the upper ends of which are opened by the piston 16 near the bottom of its downward stroke. Fuel that has been admitted to the crankcase through the inlet port 31 and transmitted therefrom past the reeds 40 and 41 to the bottom of the cylinder is compressed by the descending piston 16. When the upper ends of the passages 46 and 47 are uncovered by the descending piston 16 this compressed fuel is conducted to the cylinder on top of the piston so as to be compressed by the piston during the ascending stroke. As the piston 16 approaches the top of its upward stroke the fuel in the top of the cylinder is of course fired by the sparkplug 15 causing the piston to descend on its working stroke. The descent of the piston causes compression of the fuel that has been admitted to the bottom of the cylinder past the reeds 40 and 41 for the succeeding charge. The burnt gases are allowed to escape from the cylinder through an exhaust port 48 that is exposed by the descending piston.

One feature of the present invention resides in arranging additional inlet passages 49 and 50 in the body 10 of the cylinder. The upper ends of these passages are arranged somewhat lower than the upper ends of passages 46 and 47, see FIG. 1. These passages are opened during the descent of the piston by ports 51 that are formed through the piston 16 itself. The passages 49 and 50 are arranged on the opposite sides of the exhaust port 48 and are directed inwardly toward the center of the cylinder in such a manner as to oppose or retard flow from the cylinder into the exhaust port.

With this arrangement it will be appreciated that as the piston 16 descends the burnt gases are permitted to escape through the exhaust port 48 when this port is uncovered or exposed by the descending piston. Slightly later the incoming fuel is admitted to the cylinder through the intake passages 46 and 47 in the opposite direction to that of the exhaust gas flow. However, at the proper time when most, if not all, of the exhaust gases have been expelled through the exhaust port the additional passages 49 and 50 are opened admitting additional fresh fuel to the cylinder which was trapped under the piston, in such a direction as to retard flow through the exhaust port. Consequently, the fuel that is admitted through the passages 49 and 50 will oppose flow of fresh fuel tending to escape to atmosphere by following the exhaust gases into the exhaust port 48, thus retaining a greater portion of the fresh charge within the cylinder for conversion to useful power.

Another feature of the present invention resides in providing an additional inlet 52 for fuel which leads to the bottom of the cylinder above the reeds 40 and 41 when the inner end of this inlet is exposed by the piston when the piston is approaching the top of its stroke. This inlet may admit to the bottom of the cylinder additional fuel which will be compressed by the descending piston 16 prior to its admission to the top of the cylinder. This fuel may, but need not have mixed therewith, a lubricant. Also, the fuel admitted through the fuel inlet 52 may be the same as or different from the fuel that is admitted through the fuel inlet 31. All that is necessary is that the fuel admitted through the fuel inlet 52 be compatible with the fuel admitted through the fuel inlet 31.

The power takeoff from the crankshaft 20 has been illustrated as a sprocket 53, but any gear or equivalent means for taking off power may be employed. On the opposite end of the crankshaft there is a timer. This consists of a circular section 54 of insulating material in which is recessed so as to be flush with its face an arcuate metal conductor segment 55 that is wiped by a carbon brush 56 that is urged by a spring-actuated arm into contact therewith. The brush 56 is mounted in a clamp 58 that is adjustably mounted on the end of the crankshaft 20. Preferably, the ends of the arcuate metallic conductor segment 55 terminate short of the ends of the recess in the section of insulating material so that small gaps 59 are present to receive possible wear particles of carbon from the carbon brush and to insure a precise "break point."

The arcuate conductor 55 is electrically connected to a coil 60, condenser 61, and source of electric potential such as a battery 62 grounded as indicated. By rotatably shifting the position of the assembly 54 in any suitable or conventional manner the timing of the spark at the sparkplug 15 can be advanced or retarded as required by the speed of the engine.

In this form of timer construction it will be appreciated that the brush sweeps over the segment 55 with a smooth even rotary motion and that there are no reciprocating or oscillating parts which are required to make and break contact as a result of their reciprocations or oscillations. Consequently, inertias involved in reciprocating or oscillating parts are not present in the improved timer construction.

As illustrated in FIGS. 9 and 10, during upward strokes of the piston, fuel and lubricant can be admitted through the inlet ports 31 and 52. The fuel that is admitted to the crankcase through the inlet port 31 is transferred from the crankcase to the bottom of the cylinder when the reeds 40 and 41 are opened. When the piston is in the upper portion of its stroke it closes the passages 46, 47, 49, and 50 and fuel that has been previously introduced into the cylinder above the piston is compressed thereby and is fired at or just before the commencement of the downward stroke of the piston. During the descent of the piston on its working stroke it uncovers the exhaust port 48 allowing the burnt gases to escape therethrough. The piston also consecutively uncovers or opens the passages 46, 47, and 49 and 50 so that fuel taken into the bottom of the cylinder and entrapped therein by the reeds 40 and 41 and compressed by the descending piston will be transferred from the bottom of the cylinder to the top of the cylinder. By reason of the fact that the fuel is highly compressed above the reeds by the descending piston a larger fuel charge will be pushed or forced through the transfer passages when they are opened by the descending piston during the short period that the transfer ports are open. As the size of the transfer ports is fixed and the period that the transfer ports are open is controlled by the movements of the piston it is apparent that more fuel can be transmitted to the top of the cylinder if the fuel is isolated from the crankcase and compressed in the bottom of the cylinder by the descending piston prior to the opening of the transfer ports.

The improved engine is highly advantageous in that combinations of fuels may be employed through the ports 31 and 52 if desirable and that more fuel can be admitted to the top of the cylinder during each fuel admission stroke by being compressed to a higher degree than would be possible than if the crankcase were left constantly open to the bottom of the cylinder as in the conventional two-stroke engine.

In FIGS. 11 and 12 an alternative form of reed construction is disclosed wherein the reeds are indicated at 65 and 66 anchored as at 67. These reeds have downwardly bent ends 68 and 69 forming part of a flux path for a permanent magnet, the parts of which are indicated at 70 and 71. The reeds have opposed inwardly extending lugs 72 and 73 which are adapted to be traversed by a magnetic permeable material, such as that indicated at 74. This section of permeable material is mounted on the slidable elements 75 and 76 which embrace the connecting rod 77.

When the section of permeable material which may be soft iron or the like, indicated at 74, is moved into a position overlying the lugs 72 and 73 it more closely enters into and forms a part of the magnetic flux path which includes the reeds 65 and 66. Consequently, when 74 is directly over the lugs 72 and 73, the reeds will be urged upwardly to include 74 in the flux path. When the element 74 which may be likened to an armature is moved laterally relatively to the lugs 72 and 73, it is shifted out of the direct flux path and will allow the reeds to lower or close.

A feature of the improved engine is that it is quite versatile and may be operated in three basic two-stroke induction modes with a minimum of part changes. In other words, with one set of basic parts of an engine the engine may be caused to supply different characteristics which could otherwise only be obtained by three separate and individually designed engines meeting each specific requirement. For example, if an engine is required which is most reliable for load applications, an engine with a minimum number of moving parts would be most applicable, and a piston-timed engine would normally be chosen. In the improved engine by removal of the slidable elements which embrace the connecting rod and the reeds enables the crankcase inlet 31 to be closed and fuel and lubricant to be admitted to the cylinder through the inlet 52 and conducted to the crankcase. The engine will then function as a piston timed inlet and may be regarded as being very reliable due to the small number of moving parts. However, since the piston under these circumstances controls the inductance of the charge, at low speed some of the charge will blow back through the inlet 52 and its carburetor causing the economy of the engine to be only fair.

On the other hand, if an engine is required that has maximum economy of fuel consumption as its predominant characteristic the inlet 52 may be closed and the slides and reeds are employed in conjunction with the fuel inlet at 31 through which a fuel and oil mixture is admitted from its carburetor. The engine may then function as a reed-controlled engine operating on a strictly pressure differential principle. This is a very economical engine since the gas charge at low speed cannot be forced through the inlet 31 and its carburetor due to the closure of the reeds. In this form the added moving parts detract from the reliability. In this form of construction the mechanisms employed for assisting in the opening of the reeds should be deleted for this mode of operation for maximum economy.

In a third situation where an engine is required for maximum output of power as its predominant feature, then the slides and reeds are both employed and both inlets 31 and 52 supply fuel from their respective carburetors. Under these conditions which may be regarded as forming a combination-timed engine the reeds, if not otherwise assisted, will not open until sufficient pressure differential exists across their surfaces to overcome their bias exerted by the reed material. Since there is a time-delay in the reed opening and since the interval for exchange admission to the top of the cylinder is fixed by the engine speed, it will be apparent that the inherent time-delay of the reed causes the admission of less fuel charge during the available period than if the reeds are assisted to their open position a little earlier than in response to pressure differential alone. For this reason, cams or a magnetic flux armature is employed to trigger or excite movement of the reeds in advance of movements created by pressure differential alone. Other means may be employed for advancing the opening of the reeds. When the slides, reeds, and both fuel inlets are employed an engine having highest output performance is obtained at the possible sacrifice of reliability due to the increased number of moving parts.

Various changes may be made in the details of construction without departing from the spirit and scope of the invention as defined by the appended claims.

I claim:

1. An internal combustion engine having a cylinder, a piston reciprocable therein, a crankshaft, a crankcase therefor, a connecting rod connecting the piston to the crankshaft, closure-maintaining means mounted for sliding movement transversely of the cylinder through which the connecting rod is movable, and at least one reed permitting flow from the crankcase to the cylinder but not in the reverse direction, and means between the closure-maintaining means and the reed for opening the reed during upstrokes of the piston.

2. An internal combustion engine having a cylinder, a piston reciprocable therein, a crankshaft, a crankcase therefor, a connecting rod connecting the piston to the crankshaft, closure-maintaining means mounted for sliding movement transversely of the cylinder through which the connecting rod is movable, oneway valve means for conducting flow around the closure-maintaining means from the crankcase to the cylinder but preventing flow in the reverse direction, and cam means between the closure-maintaining means and the oneway valve means for opening the oneway valve means during upstrokes of the piston.

References Cited in the file of this patent

UNITED STATES PATENTS

| | | |
|---|---|---|
| 640,393 | Lewis | Jan. 2, 1900 |
| 735,036 | Jones | July 28, 1903 |
| 886,539 | Peugeot et al. | May 5, 1908 |
| 961,315 | Peugeot et al. | June 14, 1910 |
| 1,613,528 | Palmer | Jan. 4, 1927 |
| 1,755,260 | Johnson | Apr. 22, 1930 |
| 1,977,657 | Watson | Oct. 23, 1934 |
| 2,115,657 | Venediger | Apr. 26, 1938 |
| 2,193,510 | Doll et al. | Mar. 12, 1940 |
| 2,228,832 | Lieberherr | Jan. 14, 1941 |

FOREIGN PATENTS

| | | |
|---|---|---|
| 396,669 | France | Feb. 2, 1909 |
| 24,565 | Great Britain | Nov. 2, 1906 |